United States Patent [19]

Yamada et al.

[11] Patent Number: 4,751,539
[45] Date of Patent: Jun. 14, 1988

[54] VARIABLE POWER FINDER

[75] Inventors: Yasuyuki Yamada, Tokyo; Yasuhisa Sato, Kanagawa; Hiroki Nakayama, Kanagawa; Kouji Oizumi, Kanagawa, all of Japan

[73] Assignee: Canon Kabushiki Kaisha, Tokyo, Japan

[21] Appl. No.: 80,570

[22] Filed: Jul. 31, 1987

[30] Foreign Application Priority Data

Aug. 12, 1986 [JP] Japan .......................... 61-189199[U]
Aug. 12, 1986 [JP] Japan .......................... 61-189200[U]
Aug. 12, 1986 [JP] Japan .......................... 61-123757[U]
Aug. 12, 1986 [JP] Japan .............................. 61-123758
Aug. 12, 1986 [JP] Japan .............................. 61-123759

[51] Int. Cl.$^4$ ............................................. G03B 13/12
[52] U.S. Cl. .................................................. 354/222
[58] Field of Search ......................... 354/222; 350/570

[56] References Cited

U.S. PATENT DOCUMENTS 4,256,396 3/1981 Kawaguchi et al. ............... 354/222
4,277,158 7/1981 Zawodny ........................ 354/222 X Primary Examiner—Michael L. Gellner
Attorney, Agent, or Firm—Fitzpatrick, Cella, Harper & Scinto

[57] ABSTRACT

A variable power finder having an objective lens of positive refracting power comprising a first lens unit of positive refracting power movable along an optical axis and a second lens unit releasably attached to the first lens unit in axial alignment, wherein a real image to be observed is formed by the objective lens.

11 Claims, 12 Drawing Sheets

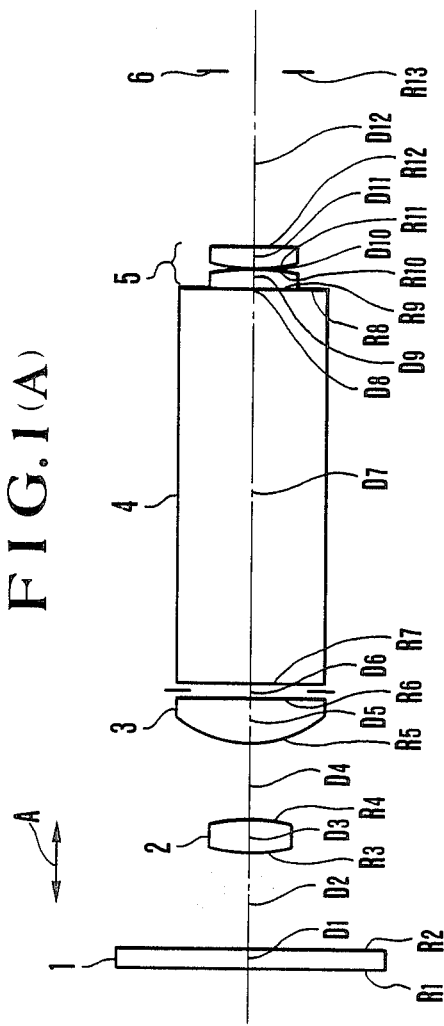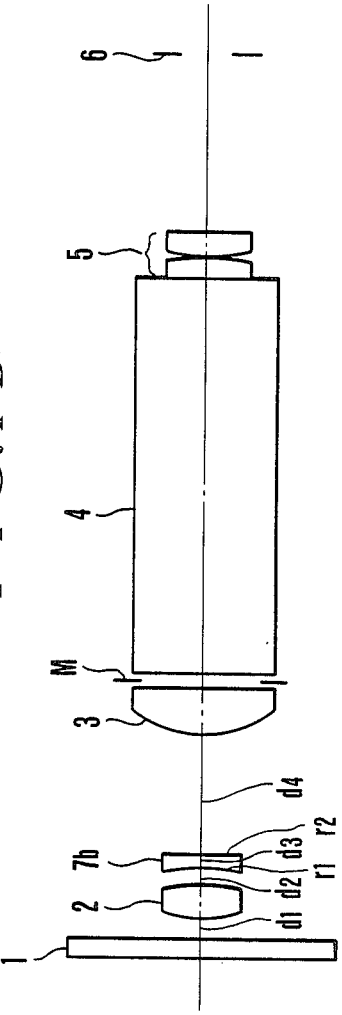

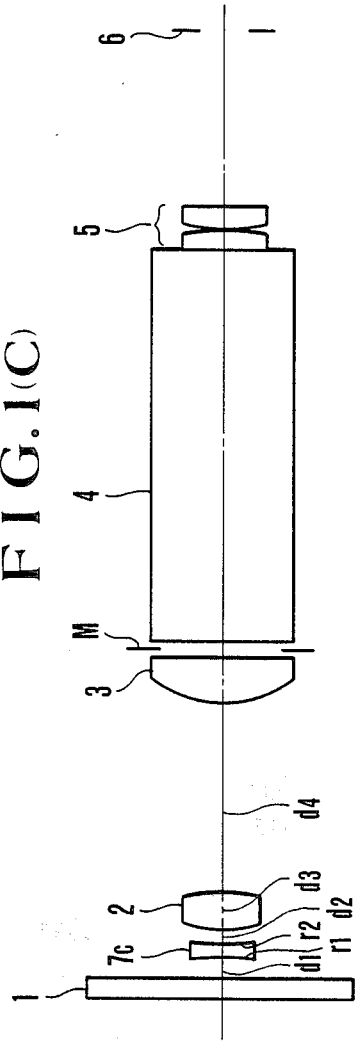
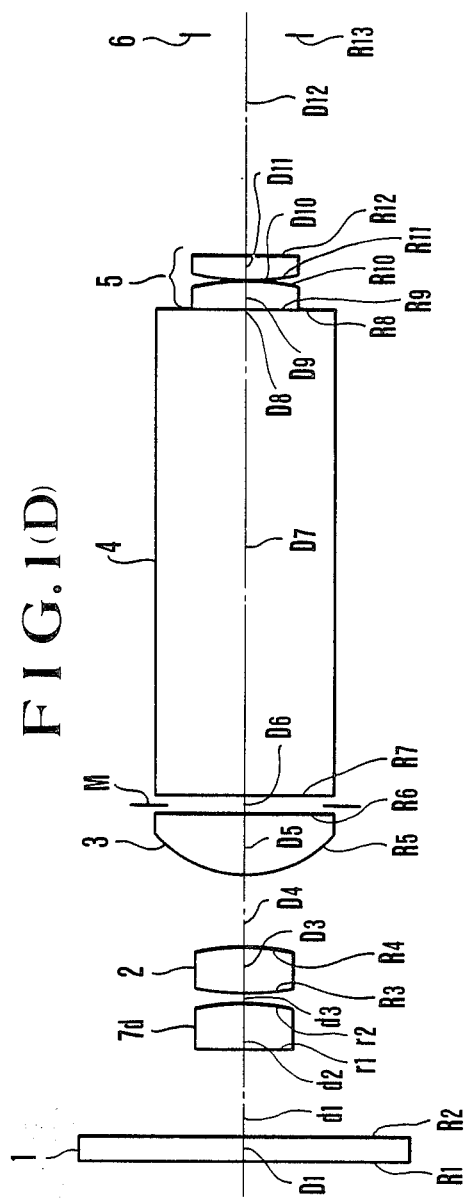

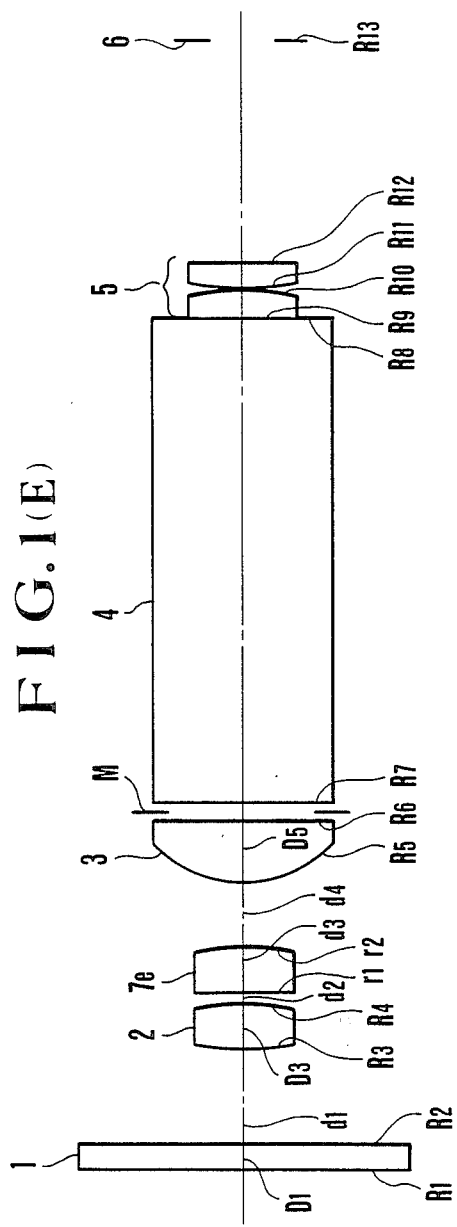
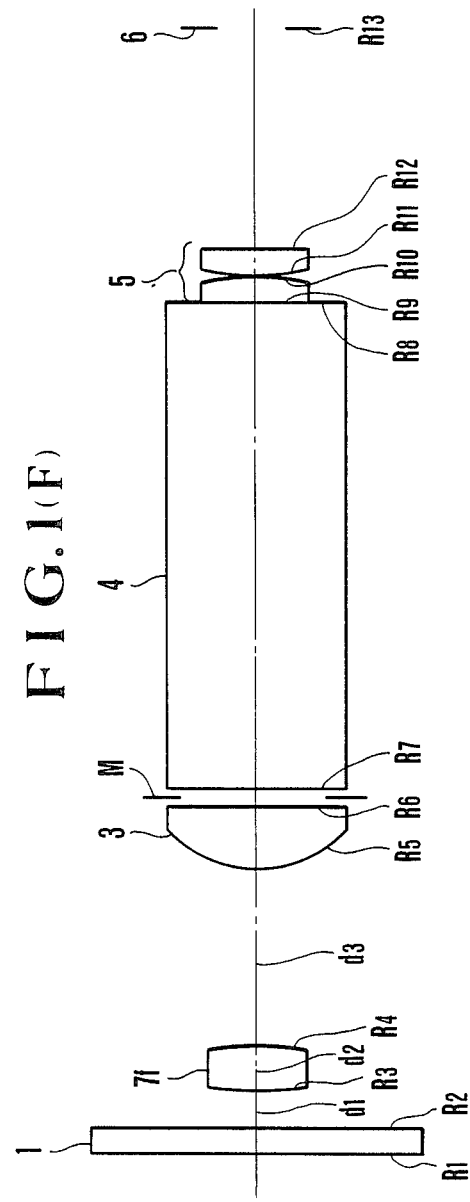

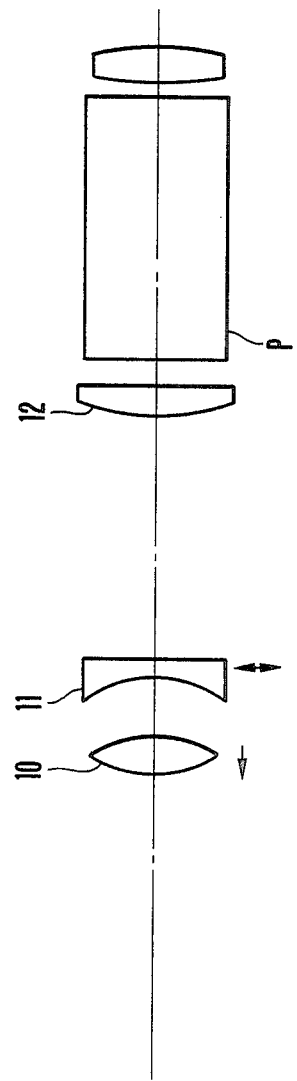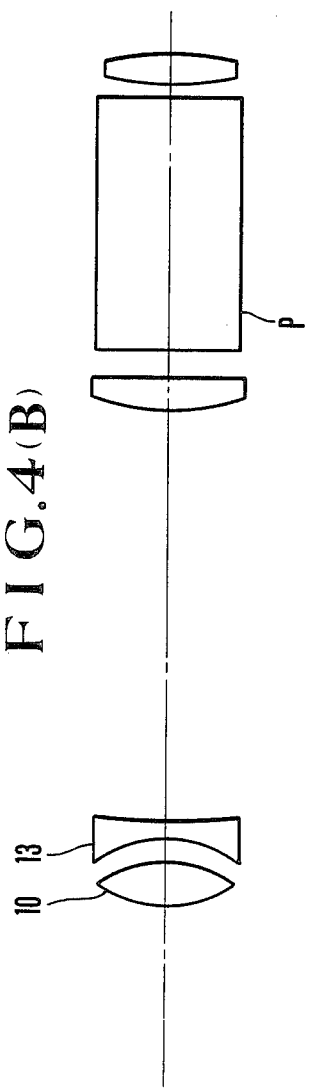

VARIABLE POWER FINDER

BACKGROUND OF THE INVENTION

1. Field of the Invention

This invention relates to variable power finders, and more particularly to real image type variable power finders of simple structure suited to be used in photographic cameras or video cameras, while still preserving good optical performance before and after the magnification of the finder is varied.

2. Description of the Related Art

For the camera whose photographic and finder systems have nothing in common, when the photographic system is variable in power, it has been desirable from the standpoint of quick and easy shootings to make variable the angular field of the finder, or the display of the shooting area within the viewfield with variation of the power.

In the past, as the means for changing over the display of the shooting area there have been known:

(a) the method of varying the size of the viewfinder frame;

(b) the method of varying the magnification of the finder; and others.

An example of the method of varying the size of the viewfinder frame, as in Japanese Laid-Open patent application No. Sho 54-161931, is by moving a member for forming the image of a viewfinder frame to change the apparent size of the viewfinder frame. In this case, however, as the magnification of the finder increases, or the angular field of the finder narrows, the apparent angular field of the viewfinder frame becomes so small as to give a disadvantage that, for the observer, the finder becomes very uncomfortable to view through.

In the method of varying the finder magnification itself, as, for example, disclosed in Japanese Laid-Open Utility Model patent application No. Sho 59-168738 assigned to the assignee of the present invention, where the objective lens constituting part of an Albada finder is interchanged with another one having a different refracting power, on the other hand, the apparent angular field of the finder can be maintained constant. For the observer, therefore, it becomes possible to view through the finder with a closer sense to the actual shooting sense. Hence, it can be said that the latter method is superior to the former.

Besides this, there is another or real image type finder whose objective lens is positive in refracting power, or the so-called Kepler-type finder. Because of its ability to put a field stop mask in coincidence with the real image plane, this finder gives a clear contour to the viewfield frame. Another merit is that, despite the fact that position of the observer's eye changes, the field of view of the finder is not caused to change. For these reasons, the Kepler-type finder has round its use in many variable power finders. However, it has a disadvantage that the size of the finder system is liable to increase due to the formation of the real image of the viewfield. To preserve high grade of optical performance, the complexity of structure of the finder system also tends to increase. This tendency has become prominent when a variable power capability is introduced to the Kepler-type finder.

For example, the Japanese Utility Model Patent Publication No. Sho 29-16556 provides the technique of varying the power by interchanging the objective lens as a whole. But, the employment of this technique led to a large number of lens elements to be used.

Also, the introduction of the zoom function to the real image type finder as in the Japanese Laid-Open patent application No. Sho 61-156010 necessitates an operating mechanism of so high precision accuracy that the positions and speeds of a plurality of lenses can be sufficiently controlled well.

SUMMARY OF THE INVENTION

A first object of the invention is to provide a real image type finder having a lens system of simplified structure and capable of easily performing variation of the power.

A second object is to provide a real image type finder of compact form with good performance.

And, another aspect of the present invention, in application to a compact variable power finder for observing a real image, is to accomplish a variation of the power in such a way that an objective lens of positive refracting power is axially moved, and then a supplementary lens for varying the power is inserted into or taken out of axial alignment with the objective lens.

· Further objects of the invention will become apparent from the following description with reference to the drawings.

BRIEF DESCRIPTION OF THE DRAWINGS

FIG. 1(A) is a schematic view of the optical system of a finder according to the invention before the power variation.

FIGS. 1(B), 1(C), 1(D), 1(E), 1(F) are schematic views of the optical systems of finders according to the invention after the power variation.

FIGS. 4(A) and 4(B) illustrate another embodiment.

In the graphs of the aberrations, $\Delta M$ is the meridional image surface, and $\Delta S$ is the sagittal image surface.

DETAILED DESCRIPTION OF THE PREFERRED EMBODIMENTS

FIG. 1(A) is a schematic view of the finder optical system concerning the present invention in a position before the power variation.

Figure 2A:
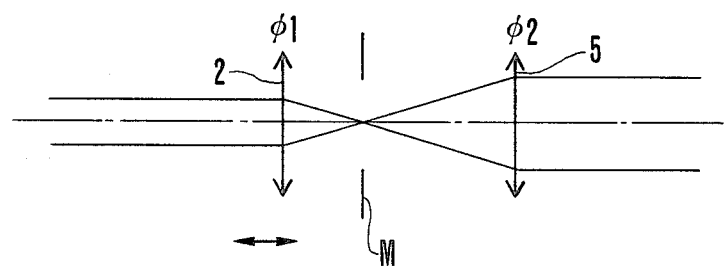
FIG. 2(A) is a diagram of geometry illustrating the paraxial refracting power arrangement according to the invention before the power variation.
Figure 2B:
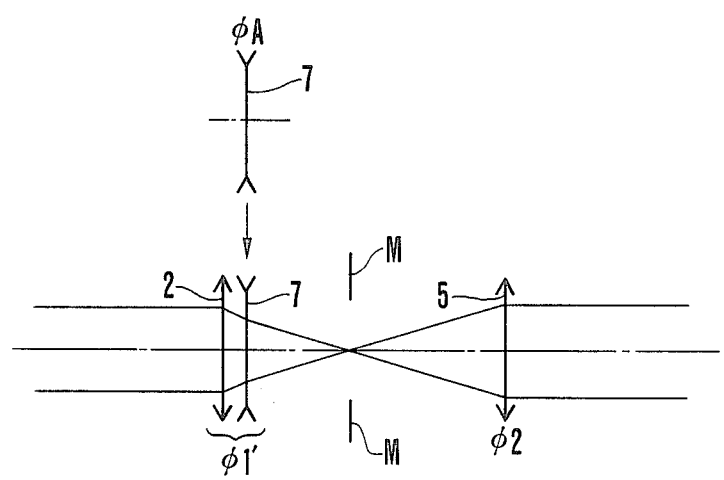
FIGS. 2(B), 2(C), 2(D), 2(E), 2(F) are diagrams of geometry illustrating the paraxial refracting power arrangements according to the invention after the power variation.
Figure 2C:
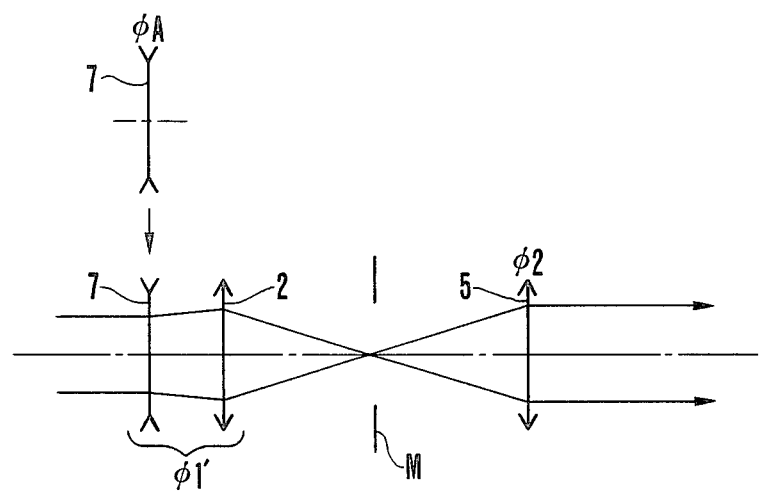
Figure 2D:
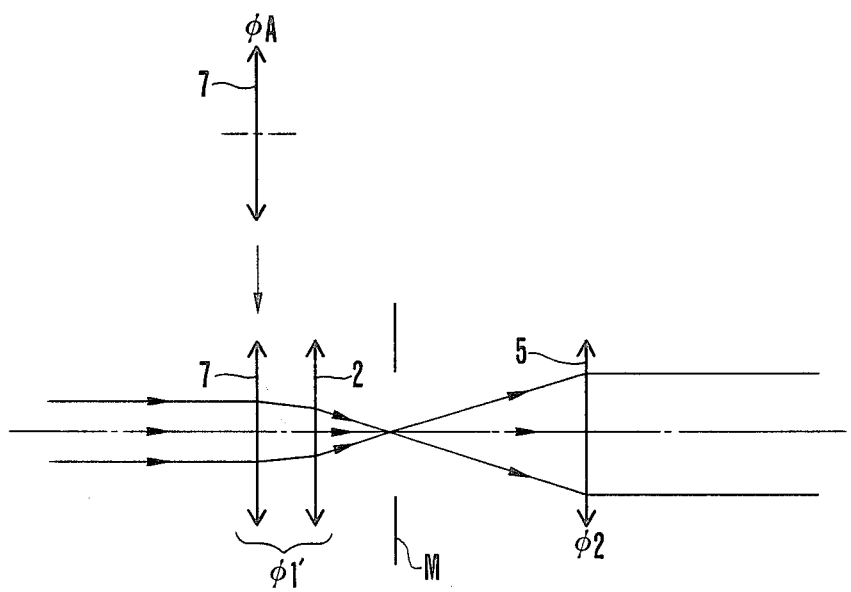
Figure 2E:
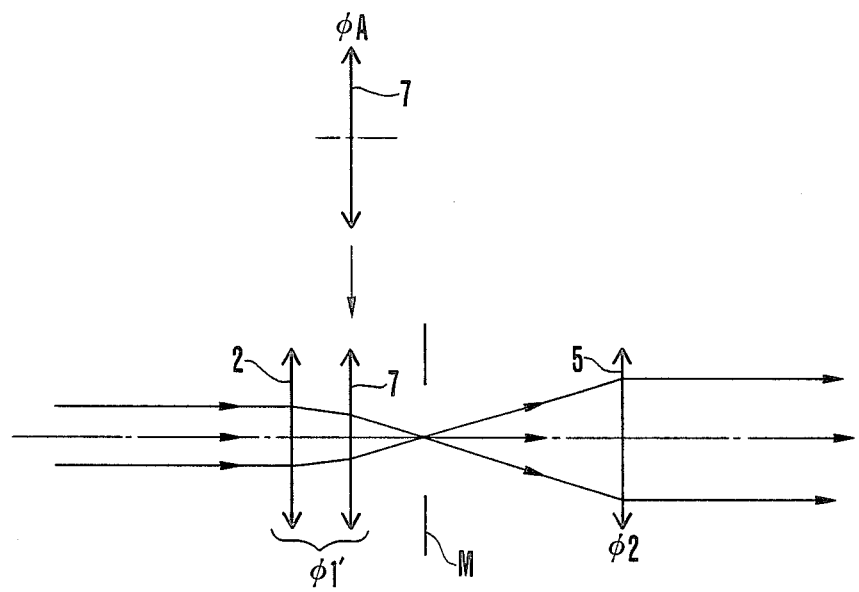
Figure 2F:
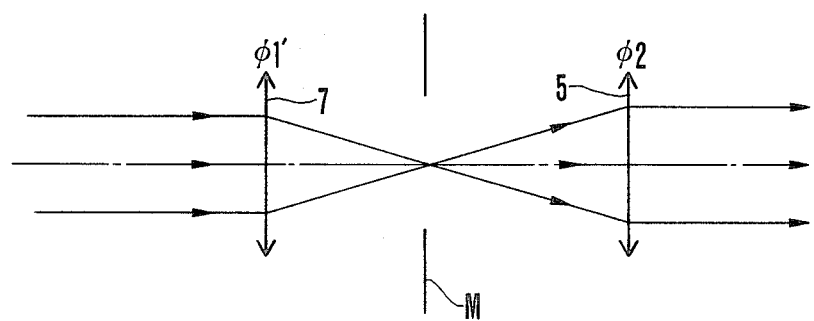
Figure 3A:
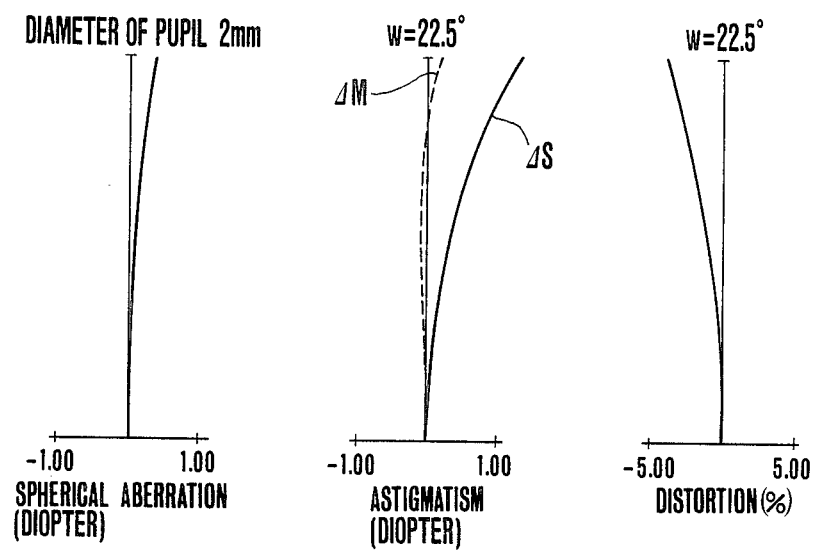
FIGS. 3(A), 3(C), 3(E), 3(G), 3(I) are graphic representations of all the aberrations of numerical examples 1, 2, 3, 4 and 5 before the power variation.
Figure 3B:
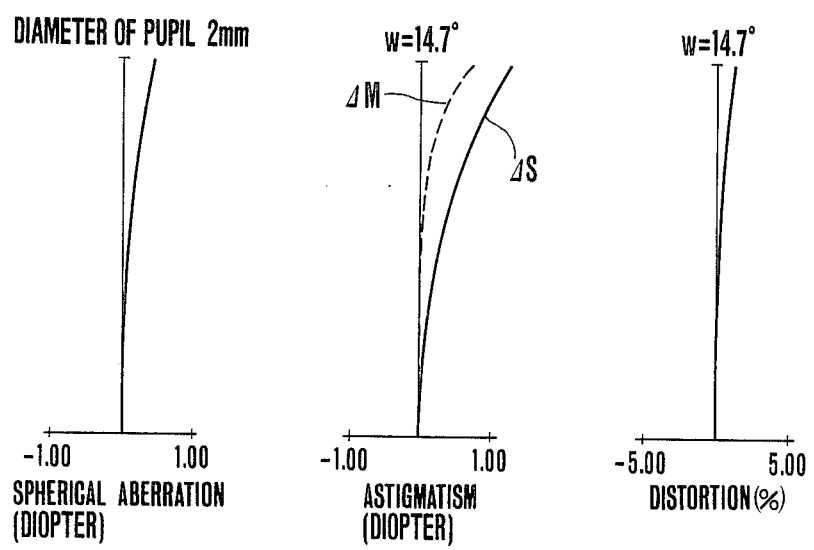
FIGS. 3(B), 3(D), 3(F), 3(H), 3(J) are graphic representations of all the aberrations of the numerical examples 1, 2, 3, 4 and 5 after the power variation.
Figure 3C:
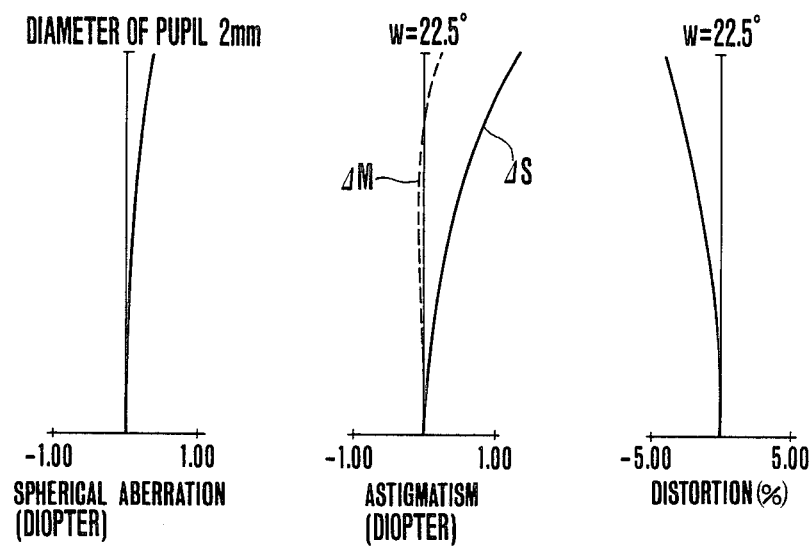
Figure 3D:
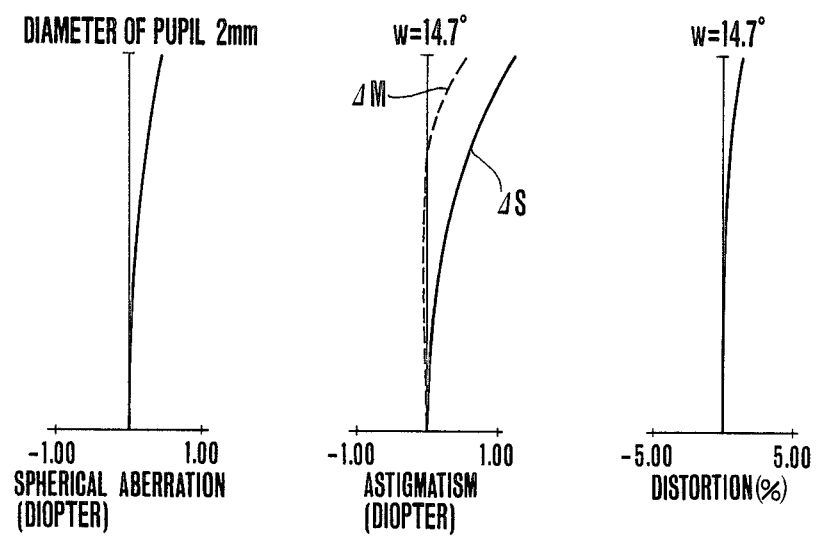
Figure 3E:
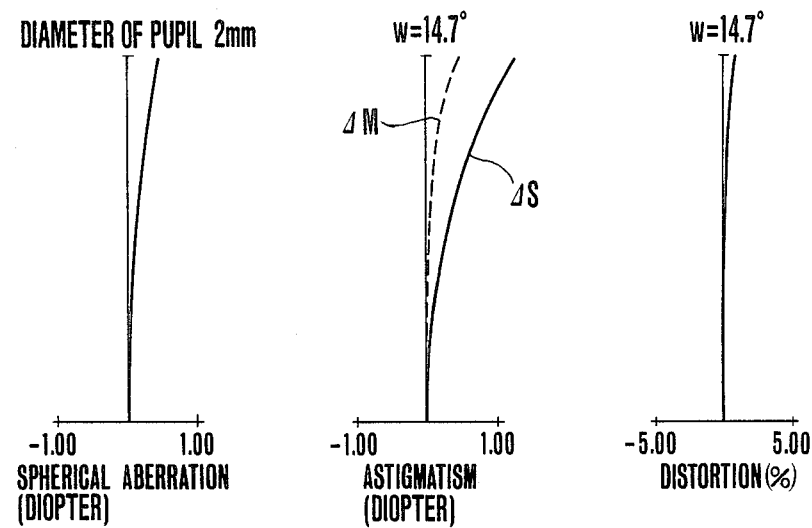
Figure 3F:
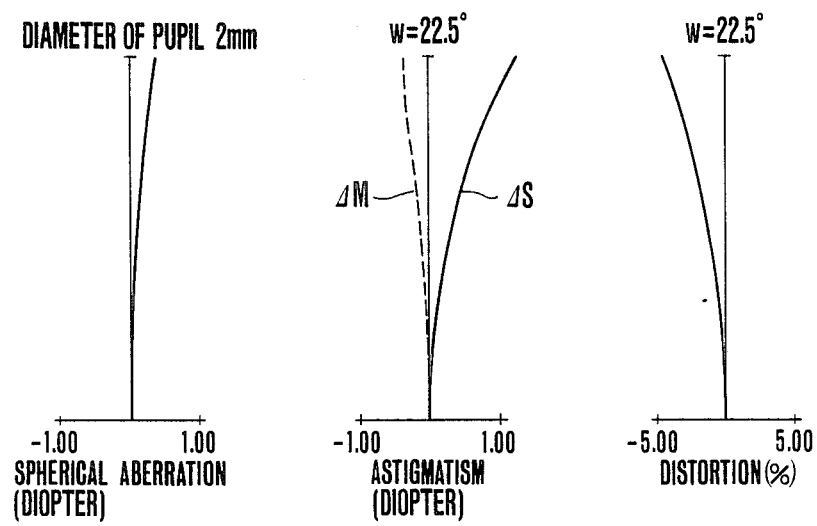
Figure 3G:
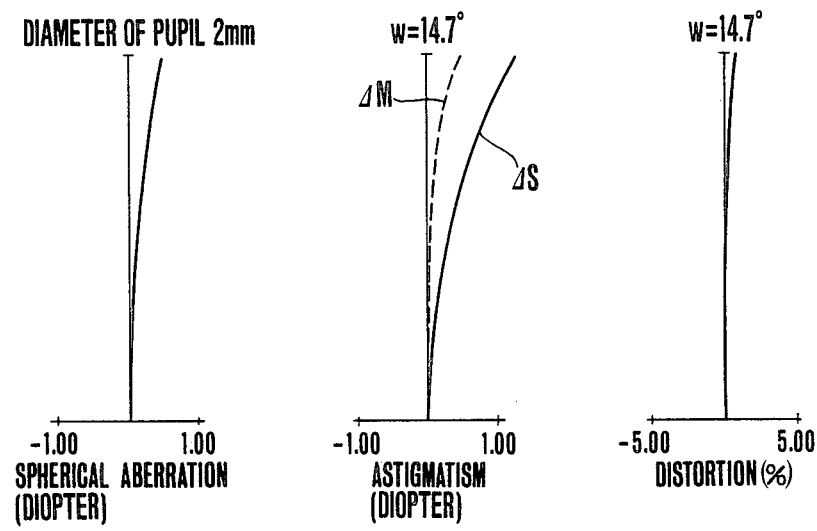
Figure 3H:
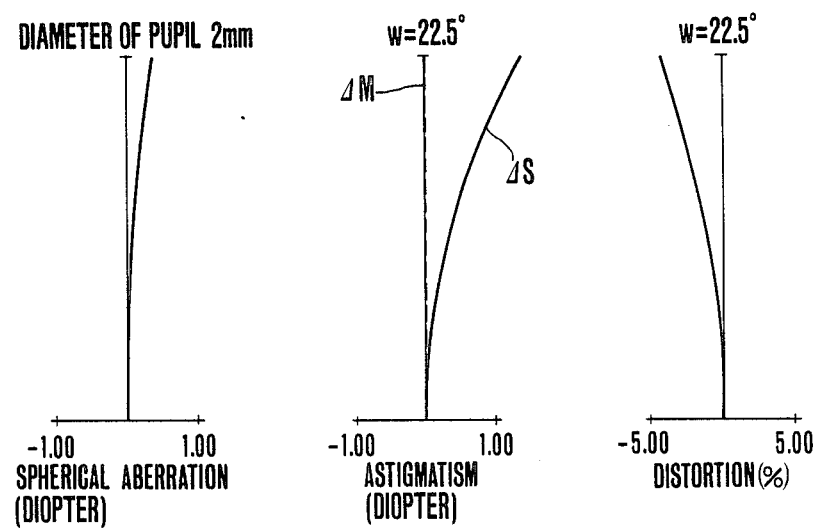
Figure 3I:
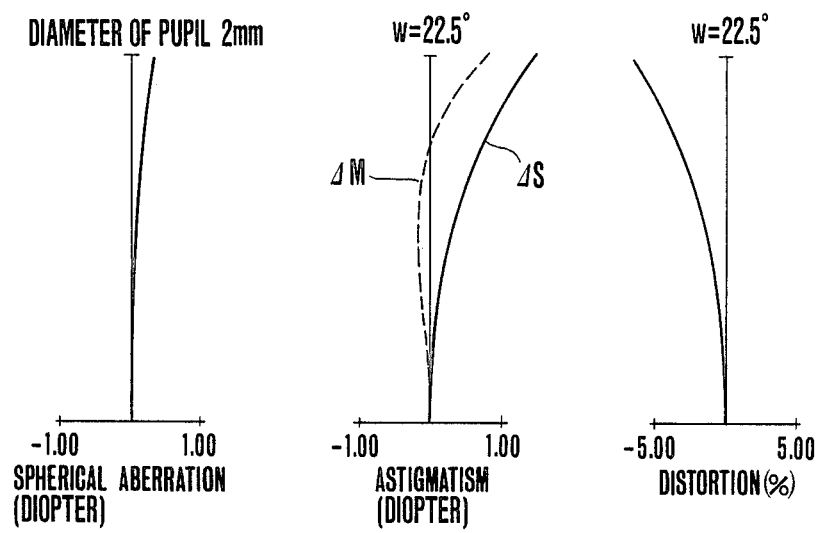
Figure 3J:
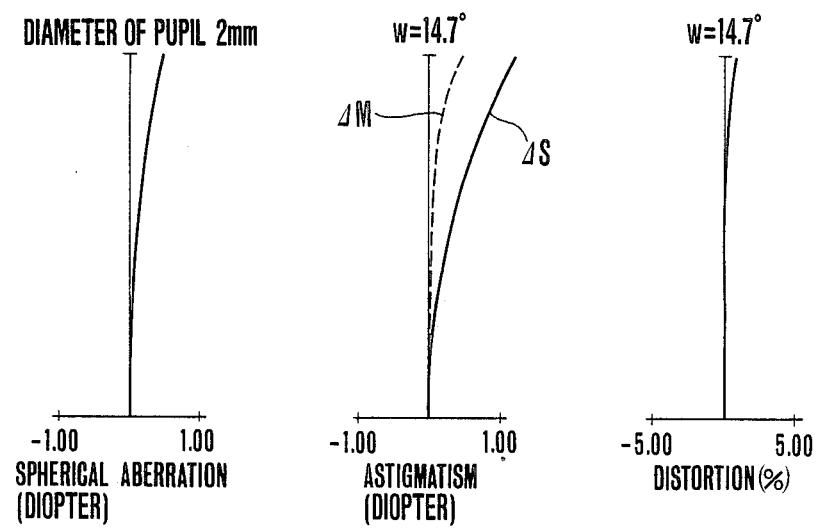

FIG. 2(A) is a schematic diagram illustrating the paraxial arrangement of the powers of the objective lens of FIG. 1(A), an eyepiece 5 and that supplementary lens 7 which allows one to achieve a variation of the power.

In these figures, a protection glass plate 1 is positioned in front of a objective lens 2 which is, in this embodiment, constructed with one positive lens. A field lens 3, a Porro prism 4 for making a vertically, horizontally inverted image to the image of the objective lens 2 shown as expanded to a glass block for the purpose of simplicity, and an eyepiece 5 of positive refracting power are arranged in this order on a common optical axis. Reference numeral 6 indicates the position of a pupil for observation. A viewfield frame mask M for limiting the field of view of the finder is provided in between the field lens 3 and the Porro prism 4.

In this embodiment, by the objective lens 2, a finder image is formed on a plane near the viewfield frame mask M with the light passing through the protection glass plate 1 and the field lens 3. Then, this finder image, after having been inverted vertically, horizontally, is observed by looking through the eyepiece 5.

In this embodiment, for the real image type finder whose optical system is perfectly afocal as shown in FIG. 2(A), the finder magnification, Y, is given by the following expression:

$$\gamma = \phi_2/\phi_2$$

where $\phi_1$ and $\phi_2$ are the refracting powers of the objective lens 2 and the eyepiece 5.

It is in this embodiment that, in response to movement of the objective lens 2, the supplementary lens 7 of negative refracting power $\phi_A$ is inserted to either the object side or the image side of the objective lens 2 and seated on the optical axis, thereby the refracting power $\phi_1$ of the objective lens 2 is reduced. Thus, an increase of the finder magnification is achieved.

Also, conversely a reduction of the finder magnification is achieved by increasing the refracting power $\phi_1$ of the objective lens 2 when another supplementary lens 7 whose refracting power $\phi_A$ is positive is attached to the front or the rear of the objective lens 2 in response to movement of the latter.

For example, in FIG. 1(B), the objective lens 2 is first moved axially forward, and a supplementary lens 7b of negative refracting power is then put on the image side of the objective lens 2 in axial alignment to vary the power to a higher magnification.

In FIG. 1(C), the same movement of the objective lens 2 is followed by insertion of another supplementary lens 7c on the object side. Hence, the power is varied to a higher magnification.

In FIG. 1(D), the objective lens 2 is moved axially forward, and a supplementary lens 7d of positive refracting power is then put on the object side to achieve a variation of the power.

In FIG. 1(E), the same movement of the objective lens 2 is followed by putting another supplementary lens 7e of positive refracting power on the image side to achieve a variation of the power.

In FIG. 1(F), there is shown an example of replacing the whole objective lens 2 by another one 7e. At this time, in order to minimize the variation of the aberrations between before and after the power variation with the limitation of the number of lens elements to a minimum, at least one aspherical surface is applied to each of the objective lens 2 and the supplementary objective lens 7e, being figured so that the positive refracting power becomes progressively weaker from the paraxial region to the marginal zone.

Though, in the above-cited practical examples, the power variation has been achieved by the minimum number of lens elements, a larger number of lens elements may be used to make up the objective lens. To show an example, the objective lens is constructed with a front lens 10 of positive refracting power and a rear lens 11 of negative refracting power arranged as shown in FIG. 4(A) before the power variation. Then, after the power variation, the front lens 10 takes a more frontward position and the rear lens 11 is substituted by another one 13 of different refracting power, as shown in FIG. 4(B). Thus, a desired range of power variation is achieved. Note, 12 is a field lens, and P is a Porro prism. Besides these, though not shown, the lens 13 may otherwise be transferred to the object side. Though the second embodiment has been described as applied to the objective lens of plus-minus power arrangement, all the constituent lenses may be of positive refracting power. Many other variations than those described above can be considered.

Also, in the embodiments of the invention, to carry out good correction mainly for off-axis aberrations, it is desirable that the objective lens having a positive refracting power satisfies the following condition:

$$0 \leq f_0/R_3 \leq 2.0$$

where $f_0$ is the overall focal length of the objective lens, and $R_3$ is the radius of curvature of the front most lens surface. When the upper limit of the above-described inequalities is exceeded, under-correction of field curvature results. Therefore, a large astigmatic difference is produced. When the lower limit is exceeded, the field curvature is over-corrected, and the astigmatic difference is large. Hence, in either case, the difficulty of correcting the off-axis aberrations is increased objectionably.

Though, in the FIG. 1 embodiment, the supplementary lens which is releasably attached in response to movement of the objective lens, has been constructed with one element, two or more lens elements may be used to make up this supplementary lens.

Also, though two lens elements of the same but symmetrical shape have been employed to make up the eyepiece in order to correct aberrations, two or more lens elements of entirely different shape may be used.

Since in the embodiments of the invention, the position of the viewfield frame mask M remains unchanged during the power variation of the finder the only variation resulting from the power variation is in the magnification of the image of the viewfield, but not in the size of the viewfield frame. Thus, the apparent viewfield for the shooting area can be maintained constant.

Further, in the embodiments of the invention, in order that, despite the total number of lens elements being few and the entire system being compact, the various aberrations are well corrected, it is preferred to construct the objective lens by means of at least one aspherical surface in one of the surfaces thereof.

Next, numerical examples of the invention are shown. In the numerical examples, Ri is the radius of curvature of the i-th lens surface counting from front. Di or di is the i-th lens thickness or air separation counting from front. Ni and vi are the refractive index and Abbe number of the glass of the i-th lens element counting from front.

The aspherical surface is depicted in coordinates with the optical axis as X-axis and the normal to the optical axis as H-axis, the direction in which light advances being taken as positive, and is figured by the following equation:

$$X =$$

-continued $$\frac{(1/R) H^2}{1 + \sqrt{1 - (H/R)^2}} + AH^2 + BH^4 + CH^6 + DH^8 + EH^{10}$$

where R is the radius of curvature of the osculating sphere and A, B, C, D and E are the aspherical coefficients.

Note, R1 and R2 define the protection glass plate; R5 and R6 the field lens, R7 and R8 the Porro prism. R13 is the pupil.

Numerical Example 1
Finder Magnification: 0.41 (Before Power Variation)

| | | | |
|---|---|---|---|
| R1 = ∞ | D1 = 1.5 | N1 = 1.49171 | ν1 = 57.4 |
| R2 = ∞ | D2 = 7.0 | | |
| R3 = 10.965 | D3 = 2.8 | N2 = 1.49171 | ν2 = 57.4 |
| R*4 = −9.156 | D4 = 5.5 | | |
| R5 = 7.991 | D5 = 3.6 | N3 = 1.49171 | ν3 = 57.4 |
| R6 = ∞ | D6 = 1.0 | | |
| R7 = ∞ | D7 = 28.8 | N4 = 1.49171 | ν4 = 57.4 |
| R8 = ∞ | D8 = 0.0 | | |
| R9 = ∞ | D9 = 1.5 | N5 = 1.49171 | ν5 = 57.4 |
| R10 = −20.318 | D10 = 0.15 | | |
| R11 = 20.318 | D11 = 1.5 | N6 = 1.49171 | ν6 = 57.4 |
| R12 = ∞ | D12 = 13.0 | | |
| R13 = pupil | | | |

The values of the aspherical coefficients for R*4:

$$A = 0 \qquad \frac{f0}{R3} = 0.97$$
$$B = 4.23057 \times 10^{-4}$$
$$C = 7.13767 \times 10^{-6}$$
$$D = -4.08671 \times 10^{-7}$$
$$E = 0$$

With the supplementary lens (defined by r1, r2, d2, n1′, ν1′) when attached, the finder magnification changes to 0.65 (in a ratio of 1.585).

| | | | |
|---|---|---|---|
| R1 = ∞ | D1 = 1.5 | N1 = 1.49171 | ν1 = 57.4 |
| R2 = ∞ | d1 = 1.5 | | |
| R3 = 10.965 | D3 = 2.8 | n1′ = 1.49171 | ν1′ = 57.4 |
| R*4 = −9.156 | d2 = 1.0 | | |
| r1 = −15.780 | d3 = 1.0 | N2 = 1.49171 | ν2 = 57.4 |
| r2 = 47.893 | d4 = 9.0 | | |
| R5 = 7.991 | D5 = 3.6 | N3 = 1.49171 | ν3 = 57.4 |
| R6 = ∞ | D6 = 1.0 | | |
| R7 = ∞ | D7 = 28.8 | N4 = 1.49171 | ν4 = 57.4 |
| R8 = ∞ | D8 = 0.0 | | |
| R9 = ∞ | D9 = 1.5 | N5 = 1.49171 | ν5 = 57.4 |
| R10 = −20.318 | D10 = 0.15 | | |
| R11 = 20.318 | D11 = 1.5 | N6 = 1.49171 | ν6 = 57.4 |
| R12 = ∞ | D12 = 13.0 | | |
| R13 = pupil | | | |

R*4 is the aspherical surface with the same values of the coefficients as before the power variation.

Numerical Example 2
Finder Magnification: 0.41 (Before power variation)

| | | | |
|---|---|---|---|
| R1 = ∞ | D1 = 1.5 | N1 = 1.49171 | ν1 = 57.4 |
| R2 = ∞ | D2 = 7.0 | | |
| R3 = 10.965 | D3 = 2.8 | N2 = 1.49171 | ν2 = 57.4 |
| R*4 = −9.156 | D4 = 5.5 | | |
| R5 = 7.991 | D5 = 3.6 | N3 = 1.49171 | ν3 = 57.4 |
| R6 = ∞ | D6 = 1.0 | | |
| R7 = ∞ | D7 = 28.8 | N4 = 1.49171 | ν4 = 57.4 |
| R8 = ∞ | D8 = 0.0 | | |
| R9 = ∞ | D9 = 1.5 | N5 = 1.49171 | ν5 = 57.4 |
| R10 = −20.318 | D10 = 0.15 | | |
| R11 = 20.318 | D11 = 1.5 | N6 = 1.49171 | ν6 = 57.4 |
| R12 = ∞ | D12 = 13.0 | | |
| R13 = pupil | | | |

The values of the aspheric coefficients for R*4:

$$A = 0 \qquad \frac{f0}{R3} = 0.97$$
$$B = 4.23057 \times 10^{-4}$$
$$C = 7.13767 \times 10^{-6}$$
$$D = -4.08671 \times 10^{-7}$$
$$E = 0$$

With, the supplementary lens (defined by r1, r2, d2, n1′, ν1′) when attached, the finder magnification changes to 0.65 (at a ratio of 1.585).

| | | | |
|---|---|---|---|
| R1 = ∞ | D1 = 1.5 | N1 = 1.49171 | ν1 = 57.4 |
| R2 = ∞ | d1 = 1.5 | | |
| r1 = −15.700 | d2 = 1.0 | n1′ = 1.49171 | ν1′ = 57.4 |
| r2 = 36.990 | d3 = 1.0 | | |
| R3 = 10.965 | D3 = 2.8 | N2 = 1.49171 | ν2 = 57.4 |
| R4 = −9.156 | d4 = 13.88 | | |
| R5 = 7.991 | D5 = 3.6 | N3 = 1.49171 | ν3 = 57.4 |
| R6 = ∞ | D6 = 1.0 | | |
| R7 = ∞ | D7 = 28.8 | N4 = 1.49171 | ν4 = 57.4 |
| R8 = ∞ | D8 = 0.0 | | |
| R9 = ∞ | D9 = 1.5 | N5 = 1.49171 | ν5 = 57.4 |
| R10 = −20.318 | D10 = 0.15 | | |
| R11 = 20.318 | D11 = 1.5 | N6 = 1.49171 | ν6 = 57.4 |
| R12 = ∞ | D12 = 13.0 | | |
| R13 = pupil | | | |

R4 is the aspherical surface with the same values of the coefficients as before the power variation.

Numerical Example 3
(Before the power variation) On the telephoto side, the finder magnification = 0.60.

| | | | |
|---|---|---|---|
| R1 = ∞ | D1 = 1.5 | N1 = 1.49171 | ν1 = 57.4 |
| R2 = ∞ | D2 = 2.0 | | |
| R3 = 18.335 | D3 = 2.8 | N2 = 1.49171 | ν2 = 57.4 |
| R*4 = −12.814 | D4 = 10.5 | | |
| R5 = 7.991 | D5 = 3.6 | N3 = 1.49171 | ν3 = 57.4 |
| R6 = ∞ | D6 = 1.0 | | |
| R7 = ∞ | D7 = 28.8 | N4 = 1.49171 | ν4 = 57.4 |
| R8 = ∞ | D8 = 0.0 | | |
| R9 = ∞ | D9 = 1.5 | N5 = 1.49171 | ν5 = 57.4 |
| R10 = −20.318 | D10 = 0.15 | | |
| R11 = 20.318 | D11 = 1.5 | N6 = 1.49171 | ν6 = 57.4 |
| R12 = ∞ | D12 = 13.0 | | |
| R13 = pupil | | | |

The values of the aspherical coefficients for R*4

$$A = 0 \qquad \frac{f0}{R3} = 0.86$$
$$B = 6.043 \times 10^{-5}$$
$$C = 6.620 \times 10^{-6}$$
$$D = -4.091 \times 10^{-7}$$
$$E = 0$$

(After the power variation), With the supplementary lens (defined by r1, r2, d2, n1', ν1') when attached on the wide angle side, the finder magnification =0.39

| | | | |
|---|---|---|---|
| R1 = ∞ | D1 = 1.5 | N1 = 1.49171 | ν1 = 57.4 |
| R2 = ∞ | d1 = 4.9 | | |
| r1 = 291.845 | d2 = 2.8 | n1' = 1.49171 | ν1' = 57.4 |
| r2 = −13.359 | d3 = 0.5 | | |
| R3 = 18.335 | D3 = 2.8 | N2 = 1.49171 | ν2 = 57.4 |
| R*4 = −12.814 | d4 = 4.3 | | |
| R5 = 7.991 | D5 = 3.6 | N3 = 1.49171 | ν3 = 57.4 |
| R6 = ∞ | D6 = 1.0 | | |
| R7 = ∞ | D7 = 28.8 | N4 = 1.49171 | ν4 = 57.4 |
| R8 = ∞ | D8 = 0.0 | | |
| R9 = ∞ | D9 = 1.5 | N5 = 1.49171 | ν5 = 57.4 |
| R10 = −20.318 | D10 = 0.15 | | |
| R11 = 20.318 | D11 = 1.5 | N6 = 1.49171 | ν6 = 57.4 |
| R12 = ∞ | D12 = 13.0 | | |
| R13 = pupil | | | |

The R*4 surface has the same values of the coefficients as before the power variation.

Numerical Example 4
(Before power variation) On the telephoto side, the finder magnification = 0.60.

| | | | |
|---|---|---|---|
| R1 = ∞ | D1 = 1.5 | N1 = 1.49171 | ν1 = 57.4 |
| R2 = ∞ | D2 = 2.0 | | |
| R3 = 18.335 | D3 = 2.8 | N2 = 1.49171 | ν2 = 57.4 |
| R*4 = −12.814 | D4 = 10.5 | | |
| R5 = 7.991 | D5 = 3.6 | N3 = 1.49171 | ν3 = 57.4 |
| R6 = ∞ | D6 = 1.0 | | |
| R7 = ∞ | D7 = 28.8 | N4 = 1.49171 | ν4 = 57.4 |
| R8 = ∞ | D8 = 0.0 | | |
| R9 = ∞ | D9 = 1.5 | N5 = 1.49171 | ν5 = 57.4 |
| R10 = −20.318 | D10 = 0.15 | | |
| R11 = 20.318 | D11 = 1.5 | N6 = 1.49171 | ν6 = 57.4 |
| R12 = ∞ | D12 = 13.0 | | |
| R13 = pupil | | | |

The values of the aspherical coefficients for R*4:

$$A = 0 \qquad \frac{f0}{R3} = 0.86$$
$$B = 6.043 \times 10^{-5}$$
$$C = 6.620 \times 10^{-6}$$
$$D = -4.091 \times 10^{-7}$$
$$E = 0$$

(After Power Variation) With the supplementary lens (defined by r1, r2, d3, n1', ν1') when attached, on the wide angle side, the finder magnification =0.39.

| | | | |
|---|---|---|---|
| R1 = ∞ | D1 = 1.5 | N1 = 1.49171 | ν1 = 57.4 |
| R2 = ∞ | d1 = 4.9 | | |
| R3 = 18.335 | D3 = 2.8 | N2 = 1.49171 | ν2 = 57.4 |
| R*4 = −12.814 | d2 = 0.5 | | |
| r1 = 197.034 | d3 = 2.8 | n1' = 1.49171 | ν1' = 57.4 |
| r2 = −13.180 | d4 = 3.85 | | |
| R5 = 7.991 | D5 = 3.6 | N3 = 1.49171 | ν3 = 57.4 |
| R6 = ∞ | D6 = 1.0 | | |
| R7 = ∞ | D7 = 28.8 | N4 = 1.49171 | ν4 = 57.4 |
| R8 = ∞ | D8 = 0.0 | | |
| R9 = ∞ | D9 = 1.5 | N5 = 1.49171 | ν5 = 57.4 |
| R10 = −20.318 | D10 = 0.15 | | |
| R11 = 20.318 | D11 = 1.5 | N6 = 1.49171 | ν6 = 57.4 |
| R12 = ∞ | D12 = 13.0 | | |
| R13 = pupil | | | |

The R*4 surface has the same values of the aspherical coefficients as before the power variation.

Numerical Example 5:
(Before Power Variation) On the wide angle side, the finder magnification = 0.37.

| | | | |
|---|---|---|---|
| R1 = ∞ | D1 = 1.5 | N1 = 1.49171 | ν1 = 57.4 |
| R2 = ∞ | D2 = 7.0 | | |
| R3 = 7.932 | D3 = 2.8 | N2 = 1.49171 | ν2 = 57.4 |
| R*4 = −9.867 | D4 = 4.5 | | |
| R5 = 7.991 | D5 = 3.6 | N3 = 1.49171 | ν3 = 57.4 |
| R6 = ∞ | D6 = 1.0 | | |
| R7 = ∞ | D7 = 28.8 | N4 = 1.49171 | ν4 = 57.4 |
| R8 = ∞ | D8 = 0.0 | | |
| R9 = ∞ | D9 = 1.5 | N5 = 1.49171 | ν5 = 57.4 |
| R10 = −20.318 | D10 = 0.15 | | |
| R11 = 20.318 | D11 = 1.5 | N6 = 1.49171 | ν6 = 57.4 |
| R12 = ∞ | D12 = 13.0 | | |
| R13 = pupil | | | |

The values of the aspherical coefficients for R*4"

$$A = 0 \qquad \frac{f0}{R3} = 1.19$$
$$B = 9.148 \times 10^{-4}$$
$$C = -1.179 \times 10^{-7}$$
$$D = -9.165 \times 10^{-10}$$
$$E = 0$$

(After Power Varition) With another interchangeable objective lens (defined by r1, r2, d2, n1', ν1') in use, on the telephoto side, the finder magnification=0.60.

| | | | |
|---|---|---|---|
| R1 = ∞ | D1 = 1.5 | N1 = 1.49171 | ν1 = 57.4 |
| R2 = ∞ | d1 = 2.0 | | |
| r1 = 18.335 | d2 = 2.8 | n1' = 1.49171 | ν1' = 57.4 |
| r*2 = −12.814 | d3 = 10.5 | | |
| R5 = 7.991 | D5 = 3.6 | N3 = 1.49171 | ν3 = 57.4 |
| R6 = ∞ | D6 = 1.0 | | |
| R7 = ∞ | D7 = 28.8 | N4 = 1.49171 | ν4 = 57.4 |
| R8 = ∞ | D8 = 0.0 | | |
| R9 = ∞ | D9 = 1.5 | N5 = 1.49171 | ν5 = 57.4 |
| R10 = −20.318 | D10 = 0.15 | | |
| R11 = 20.318 | D11 = 1.5 | N6 = 1.49171 | ν6 = 57.4 |
| R12 = ∞ | D12 = 13.0 | | |
| R13 = pupil | | | |

$$A = 0$$
$$B = 6.043 \times 10^{-5}$$
$$C = 6.620 \times 10^{-6}$$
$$D = -4.091 \times 10^{-7}$$
$$E = 0$$

As has been described above, according to this embodiment, for the objective lens is interchanged with a supplementary objective lens of different refracting power, the present invention sets forth the rule of design for the lens form and refracting power as has been defined above. This enables a required range of variation of the finder magnification to be easily obtained in such a fashion that the high quality of the finder image is maintained stable against variation of the magnification. Thus, a variable power optical system suited particularly to the real image type of finder can be achieved.

What is claimed is:

1. A finder device for observing a real image comprising:

a first lens unit movable along an optical axis and having a positive refracting power, and a second lens unit for power variation attachable to and detachable from the optical axis in response to movement of said first lens unit.

2. A finder device according to claim 1, satisfying the following condition:

$$0 \leq f_0/R \leq 2.0$$

where R is the radius of curvature of the frontmost lens surface of said first lens unit, and $f_0$ is the overall focal length of said first lens unit.

3. A finder device according to claim 2, wherein said second lens unit has a negative refracting power, and is inserted to the object side of said first lens unit when said first lens unit has moved forward.

4. A finder device according to claim 2, wherein said second lens unit has a negative refracting power, and is inserted to the image side of said first lens unit when said first lens unit has moved forward.

5. A finder device according to claim 2, wherein said second lens unit has a positive refracting power, and is inserted to the object side of said first lens unit when said first lens unit has moved rearward.

6. A finder device according to claim 2, wherein said second lens unit has a positive refracting power, and is inserted into the image side of said first lens unit when said first lens unit has moved rearward.

7. A finder device according to claim 2, wherein said first lens unit has an aspherical surface in at least one of the lens surfaces thereof.

8. A finder device according to claim 1, further including:

a field lens positioned at or near a prescribed focal plane for said first lens unit or the combination of said first and said second lens units, and an eyepiece for observing said prescribed focal plane.

9. A finder device for observing a real image, including:

a first objective lens having a positive refracting power and having at least one aspherical surface; and a second objective lens having a different positive refracting power from that of said first objective lens and having at least one aspherical surface, whereby the finder magnification is changed by interchanging one of said first and said second objective lenses with the other.

10. A finder device according to claim 9, wherein said first and said second objective lenses each consist of one lens element.

11. A finder device according to claim 10, satisfying the following condition:

$$0 \leq f_0/R \leq 2.0$$

where R is the radius of curvature of the frontmost lens surface of said first objective lens, and $f_0$ is the focal length thereof.

* * * * *

UNITED STATES PATENT AND TRADEMARK OFFICE
CERTIFICATE OF CORRECTION

PATENT NO. : 4,751,539

DATED : June 14, 1988

INVENTOR(S) : Yamada, et al.

It is certified that error appears in the above-identified patent and that said Letters Patent is hereby corrected as shown below:

IN THE FOREIGN APPLICATION PRIORITY DATA [30]

"61-189199[U]" should read --61-189199--;

"61-189200[U]" should read --61-189200--;

"61-123758" should read --61-123758[U]--; and

"61-123759" should read --61-123759[U]--.

COLUMN 1

Line 57, "round" should read --found--;

Line 61, "serve high" should read --serve a high--; and

Line 67, "No. Sho 29-16556" should read

--No. Sho 59-16556--.

COLUMN 2

Line 7, "can" should read --must--;

Line 59, "that" should read --a--; and

Line 62, "a" should read --an--.

UNITED STATES PATENT AND TRADEMARK OFFICE
CERTIFICATE OF CORRECTION

PATENT NO. : 4,751,539

DATED : June 14, 1988

INVENTOR(S) : Yamada, et al.

It is certified that error appears in the above-identified patent and that said Letters Patent is hereby corrected as shown below:

COLUMN 3

Line 13, "magnification, Y," should read --magnification, $\gamma$,--;

Line 16, "$\gamma = \phi_2/\phi_2$" should read --$\gamma = \phi_2/\phi_1$--; and Line 50, "one 7e," should read --one 7f.--.

COLUMN 4

Line 20, "front most" should read --frontmost--.

COLUMN 6

Line 9, "aspheric" should read --aspherical--; and

Line 20, "With," should read --With--.

COLUMN 8

Line 18, "R*4" should read --R*4:--; and

Line 45, --The values of the aspherical coefficient for r*2:-- should be inserted.

UNITED STATES PATENT AND TRADEMARK OFFICE
CERTIFICATE OF CORRECTION

PATENT NO. : 4,751,539
DATED : June 14, 1988
INVENTOR(S) : Yamada, et al.

It is certified that error appears in the above-identified patent and that said Letters Patent is hereby corrected as shown below:

COLUMN 10

Line 8, "eyepice" should read --eyepiece--.

Signed and Sealed this

Fourth Day of July, 1989

Attest:

DONALD J. QUIGG

Attesting Officer

Commissioner of Patents and Trademarks